(No Model.)

W. MARTIN.
PIPE COUPLING.

No. 299,662. Patented June 3, 1884.

Witnesses:
T. C. Brecht
D. S. Thompson

Inventor:
Wm Martin

UNITED STATES PATENT OFFICE.

WILLIAM MARTIN, OF TIDIOUTE, PENNSYLVANIA.

PIPE-COUPLING.

SPECIFICATION forming part of Letters Patent No. 299,662, dated June 3, 1884.

Application filed August 27, 1883. (No model.)

*To all whom it may concern:*

Be it known that I, WILLIAM MARTIN, a citizen of the United States, residing at Tidioute, in the county of Warren and State of Pennsylvania, have invented a new and useful Pipe-Coupling for Steam and other Pipes, of which the following, when taken in connection with the accompanying drawings, forming a part thereof, is a full, clear, and exact description.

My present invention is designed as an improvement or modification of the devices for which Letters Patent No. 268,917 were granted to me, bearing date of December 12, 1882.

Figure 1:
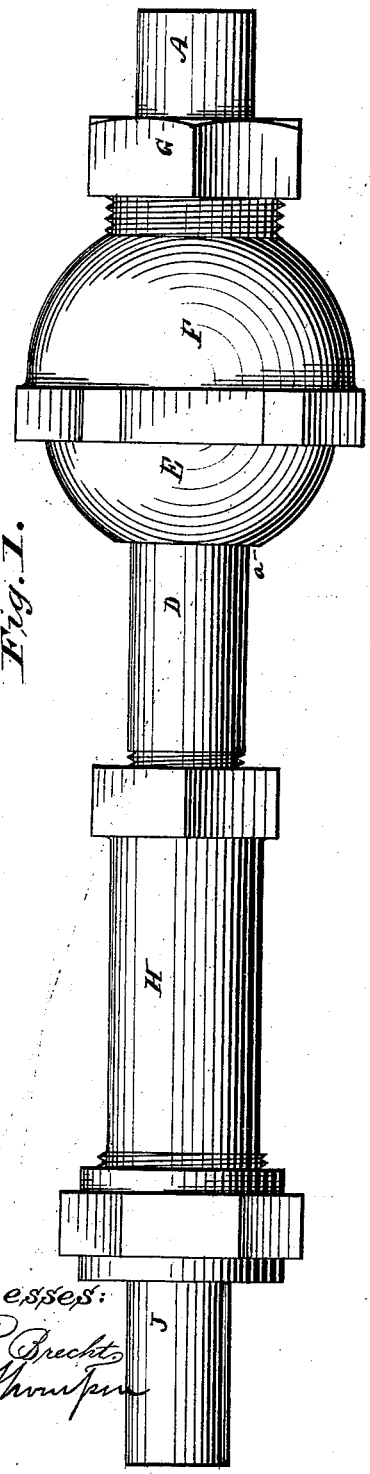
Figure 2:
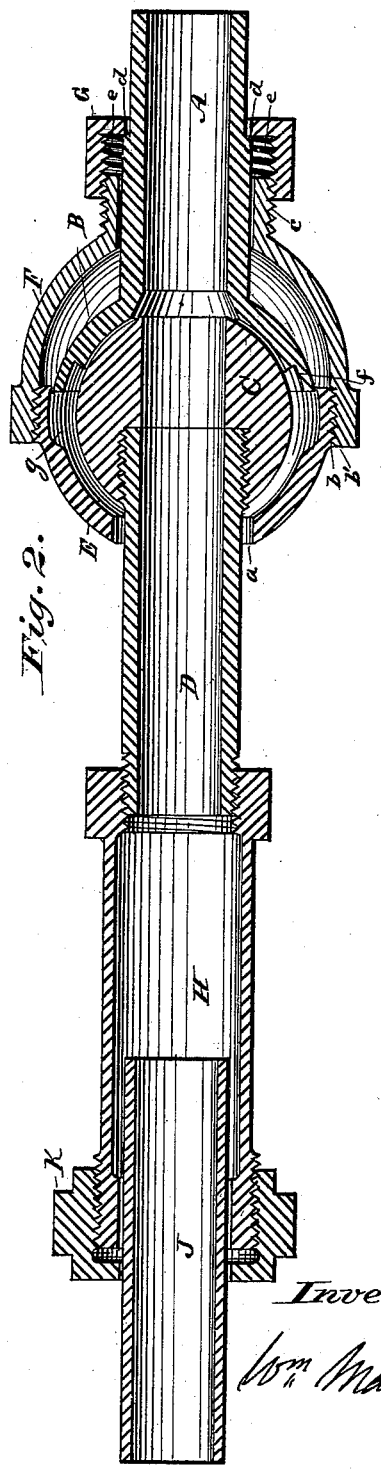

Figure 1 is a side elevation. Fig. 2 is a longitudinal sectional view.

Referring to the drawings, A designates a tube, one end of which is placed so as to form a shell, B, for the reception of the ball or sphere C.

D is a pipe or tube provided at one end with a perforated ball or sphere, C, said sphere or ball being either rigidly or detachably secured to the pipe D, and adapted to fit snugly within the shell B of the pipe A.

E is a hemispherical shell, one side of which is provided with an opening or aperture, $a$, for the reception of the tube D, while the other side of the hemispherical shell E is provided with screw-threads $b$, for the reception of screw-threads $b'$, formed on the inner side of the hemispherical shell F, so that when the two hemispherical shells E and F are joined together they form a spherical shell or casing for the ball or sphere C and shell B. The outer end of the hemispherical shell F is elongated, as shown, to form an extension, $c$, said extension being screw-threaded on its external surface to receive the screw-threads of the cylindrical nut G, which surrounds the pipe A. The pipe A is of a smaller diameter at the parts which are not surrounded by the shell F, so that a shoulder or offset, $d$, is formed thereon, against which the flange $e$ of the nut G impinges, so as to prevent its farther travel on the pipe A in the direction toward the shell B, so that when the nut G is turned the outer sphere or shell, composed of the hemispherical shells E and F, is drawn toward the pipe-section A, and the ball or sphere C brought into closer contact with the shell B on the pipe-section A, and thus a tight joint is at all times insured. The shell B is provided with a groove, $f$, on its inner surface, in which is inserted an asbestus or other suitable packing, and said packing may be of sufficient size to project into the cavity $g$ and wholly or partially fill the same, so as to insure at all times a perfectly tight joint and effectually prevent the escape of steam or other material contained within the pipes.

It will be observed that the opening or aperture $a$ in the shell E is somewhat larger than the pipe D, so as to admit of the pipe being placed at varying angles, and allowing the ball or sphere C to play back and forth in the shell B without interfering with the passage of fluid through the pipes.

H is a tube-section of larger diameter than the section D, to which it is secured, and in which a smaller tube-section, J, is free to play back and forth. The section H is provided with a stuffing-box, K, by which the escape of steam or other material is prevented at this point, and at the same time admits of the ready attaching and detaching of the tube-sections.

It will be apparent that by loosening or unscrewing the nut G from off the extension $c$ the outer sphere will be relieved from pressure on the ball or sphere C, thus making its impingement on the shell B tight or loose, as occasion may require, while at the same time, should the parts be worn away by frictional contact or become loose or leak, the same can be remedied by turning or screwing down the nut G.

My device is specially adapted for the conveyance of steam from the locomotive-engine to the cars of a train for heating the same; but it is obvious that it can be used to great advantage in conveying air to the operating mechanism of air-brakes, &c., or wherever a globe-joint or universal tube-coupling is needed.

Having thus described my invention, what I claim, and desire to secure by Letters Patent, is—

1. In a pipe-coupling, a pipe, A, provided with a hemispherical shell, B, a pipe, D, provided with a ball, C, combined with an incasing-shell having a screw-threaded extension, $c$, and nut G, as set forth.

2. In a pipe-coupling, a pipe, A, provided with a shoulder or offset, $d$, and shell B, combined with a nut, G, an incasing-shell and pipe, D, provided with a ball, C, as set forth.

3. In a pipe-coupling, the hemispherical shell B, ball C, and external casing provided with the screw-threaded extension $c$, combined with the pipe A and screw-nut G, as set forth.

4. In a ball-and-socket pipe-coupling, the external casing provided with a screw-threaded extension, $c$, combined with the nut G, pipe A, and shoulder $d$, as set forth.

5. The hemispherical disk B, provided with a groove, $f$, for packing material, combined with the outer casing and the ball C, as set forth.

WM. MARTIN.

Witnesses:
D. S. THOMPSON,
D. M. McCALL.